United States Patent [19]

Coulter

[11] Patent Number: 5,509,237
[45] Date of Patent: Apr. 23, 1996

[54] MOBILE HOME ANCHOR SYSTEM

[76] Inventor: William L. Coulter, 25633 Bejoal St., Barstow, Calif. 92311

[21] Appl. No.: 198,143

[22] Filed: Feb. 17, 1994

[51] Int. Cl.⁶ .................................................. E02D 27/48
[52] U.S. Cl. ..................... 52/126.6; 52/299; 52/DIG. 11; 248/357
[58] Field of Search ................................ 52/DIG. 11, 23, 52/126.5, 126.6, 126.7, 169.9, 299; 248/357, 252; 254/98, 100, 101, 133 A, 133 R, 134, DIG. 4, 43, 44

[56] References Cited

U.S. PATENT DOCUMENTS

| 3,606,231 | 9/1971 | Kilborn | 248/357 |
| 3,713,259 | 1/1973 | Tkach | 248/352 |
| 3,830,024 | 8/1974 | Warnke | 52/DIG. 11 |
| 4,404,780 | 9/1983 | Josephson | 52/126.6 |
| 4,866,797 | 9/1989 | Vollan | 52/23 |
| 4,976,077 | 12/1990 | Tucker | 52/126.6 |

FOREIGN PATENT DOCUMENTS 9214003 8/1992 WIPO .............................. 52/DIG. 11

Primary Examiner—Michael Safavi
Attorney, Agent, or Firm—Tod R. Nissle

[57] ABSTRACT

A device for anchoring a mobile home in position above the ground. The device comprises a bracket pair which can be mounted on an existing stanchion and mobile home without requiring modification of the stanchion or removal of the stanchion from position underneath the mobile home.

1 Claim, 3 Drawing Sheets 5,509,237

1

MOBILE HOME ANCHOR SYSTEM

This invention relates to a building structure support system.

More particularly, the invention relates to devices for anchoring a mobile home in position above the ground.

In a further respect, the invention relates to a device for anchoring a mobile home to an existing stanchion without requiring modification of the stanchion or removal of the stanchion from position underneath the mobile home.

The use of stanchions to support the I-beam undergirding of a mobile home is well known. Such a conventional stanchion is illustrated in FIG. 1 herein and identified by reference character 10. Stanchion 10 is anchored to the ground and includes L-shaped foot 11 which receives the bottom foot or flange 30C (FIG. 2) of an I-beam 30 supporting the floor 31 of a mobile home 31A.

A problem associated with the use of stanchions 10 is that I-beams supported by the stanchions can slide off of the stanchions during earthquakes or can gradually "travel" and move off of the stanchions over time due to vibration, due to tilting of the stanchions as the earth settles, or due to other causes. It is therefore desirable to secure the stanchions to the I-beams. One apparatus used to anchor an I-beam is the improved stanchion described in U.S. Pat. No. 4,882,887 to Giles et al. The Giles et al. stanchion utilizes a foot 11 which includes a pair of upstanding stop members or lips which conform to the outer edges of foot 30C and secure foot 30C in place on foot 11. The disadvantage of the Giles et al. stanchion is that in order to install the stanchion beneath the I-beam supports of existing mobile homes either the mobile home must be moved off of the stanchions or the conventional stanchions moved off of the stanchions or the conventional stanchions supporting the mobile home must, at least in part, be removed from beneath the mobile home or modified, or both. Such procedures are costly and time consuming and, in many cases, are impractical.

Accordingly, it would be highly desirable to provide an improved method and apparatus for securing existing conventional stanchions to the I-beam support of a fixed mobile home without requiring that the mobile home or the conventional stanchions be moved and without requiring modification of the existing stanchions.

Therefore, it is a principal object of the invention to provide an improved method and apparatus for anchoring a mobile home to the existing conventional stanchions supporting the mobile home above the ground.

A further object of the invention is to provide an improved method and apparatus for anchoring a mobile home to stanchions supporting the home without requiring movement of the mobile home or the stanchions supporting the mobile home.

These and other, further and more specific objects and advantages of the invention will be apparent to those skilled in the art from the following detailed description thereof, taken in conjunction with the drawings, in which.

2

Briefly, in accordance with my invention, I provide improvements used in combination with a mobile home and anchor apparatus to secure the mobile building to the anchor apparatus. The mobile building includes a body member rigidly supported on a frame member. The frame member has a flange member extending therefrom and spaced apart from the body member. The anchor apparatus includes a frame having a top and a bottom anchored to the ground; a support member contacting the flange; and, a neck interconnecting the frame and the support member. The support member has first and second side surfaces. The improvement prevents movement of the flange member off of the support member and comprises an adjustable bracket assembly including a first bracket; a second bracket spaced apart from the first bracket; and fastening means connecting the first and second brackets. The fastening means and brackets are shaped and dimensioned such that the fastening means inwardly compresses each of the first and second brackets toward one another and against the neck and one of the first and second side surface; and, the brackets prevent the flange member from moving off of the support member.

Figure 1:
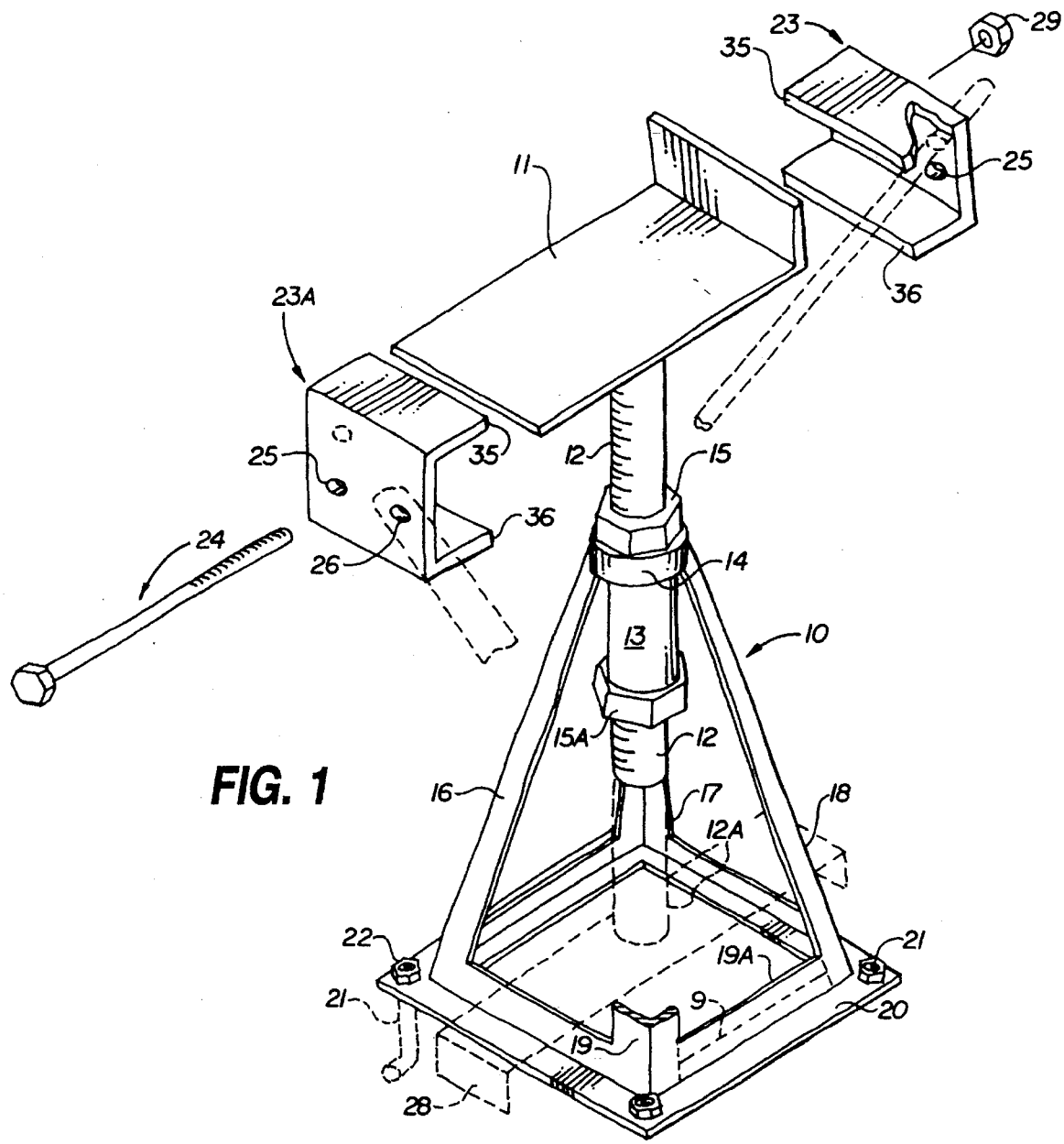
FIG. 1 is a perspective view of a conventional mobile home stanchion and anchor apparatus constructed in accordance with the principles of the invention.
Figure 2:
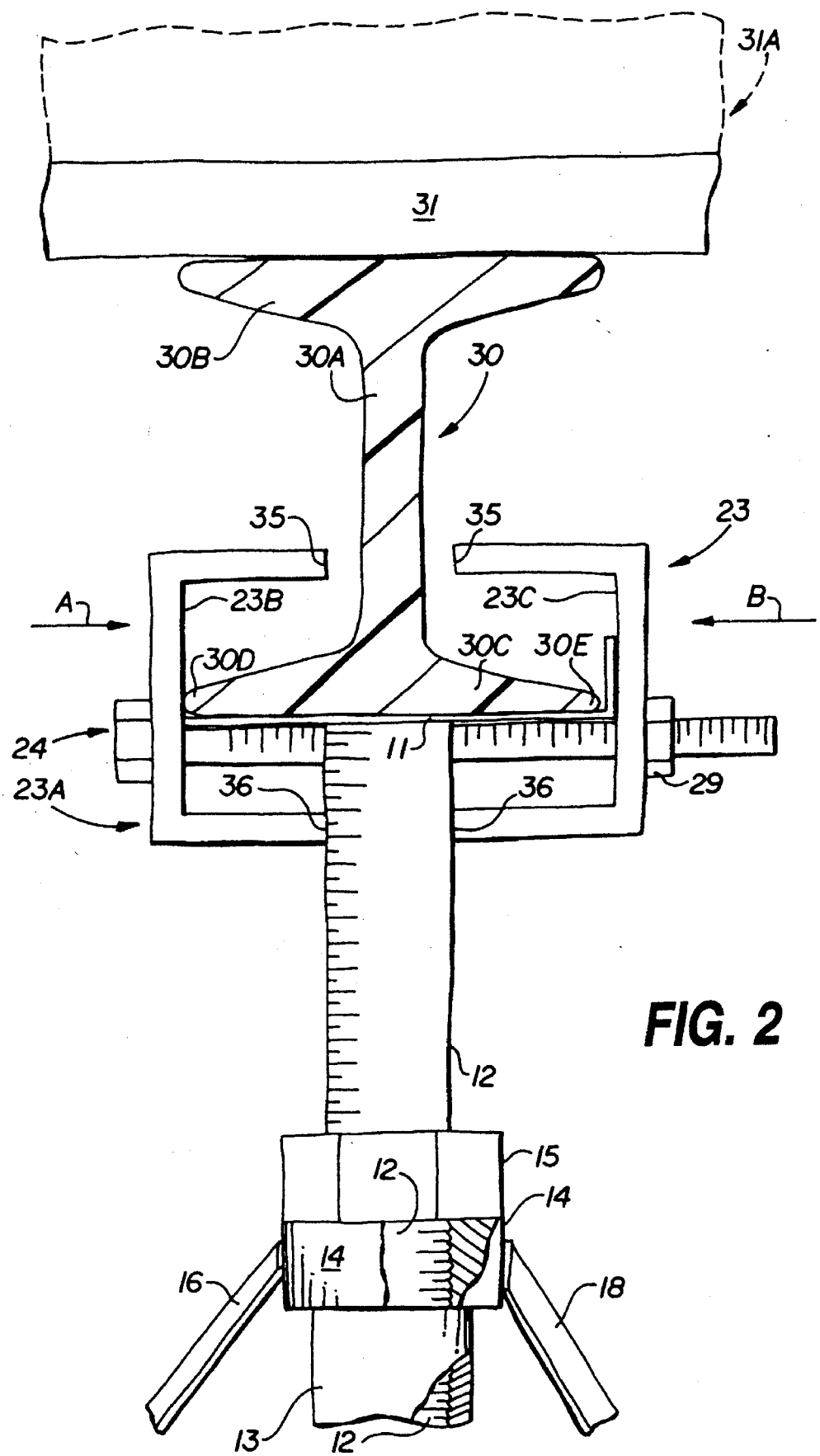
FIG. 2 is a front elevation view of the stanchion and anchor apparatus of FIG. 1 illustrating the mode of operation thereof; and, FIG. 3 is an elevation view of an alternate embodiment of the invention used with a C-shaped support beam supporting the floor of a mobile home.

Turning now to the drawings which depict the presently preferred embodiments of the invention for the purpose of describing the operation thereof and not by way of limitation of the scope of the invention, and in which like reference characters refer to corresponding elements throughout the several views, FIGS. 1 and 2 illustrates a conventional stanchion 10 supporting the I-beam 30 which supports the floor or base 31 of a mobile home 31A. Each stanchion 10 includes a frame having a top 14 and a bottom 20 anchored to the ground by anchors 21 and nuts 22 secured to externally threaded ends of anchors 21 extending upwardly through apertures in bottom 20. Anchors 21 can, if desired, be secured in concrete poured in the ground. Legs 16, 17, 18, 19 interconnect top 14 and bottom 20. Horizontal structural supports connected to base 20 spanning and interconnecting pairs of legs 16 to 19 can, if desired, be removed. For example, the support 19A spanning the distance indicated by arrows 9 can be removed or omitted during the construction of stanchion 10. Externally threaded neck 12 slidably extends through an aperture in top 14 and through hollow cylindrical sleeve 13 attached to top 14. If desired, top 14 and sleeve 13 can be internally threaded as shown in FIG. 2 so that neck 12 can be threaded into top 14 and sleeve 13. Internally threaded nuts 15 and 15A on neck 12 are turned about neck 12 to move up and down neck 12 to facilitate the raising and lowering of neck 12 through sleeve 13 and to secure neck 12 in a desired position in sleeve 13. When nuts 15 and 15A are tightened against top 14 and sleeve 13 in the manner shown in FIG. 1, movement of neck 12 through sleeve 13 is inhibited or prevented. Neck 12 can include a lower portion 12A which is attached to a U-shaped support 28 having feet which rest on the ground outside of base 20.

The anchor apparatus of the invention includes identical generally U-shaped clamps 23 and 23A each including a pair of apertures 25, 26 formed through the back of the clamp and including a pair of feet extending outwardly from the back of the clamp and having contact edges 35 and 36. Edges 35 and 36 need not be linear, and can be curved or have a combination of linear and arcuate portions. A pair of bolts 24 is used to interconnect clamps 23 and 23A. One bolt 24 extends through aperture 25 of clamp 23A and aperture 26 of clamp 23. The other bolt 24 extends through aperture 26 of clamp 23A and aperture 25 of clamp 23. Nuts 29 are used to secure bolts 24 in clamps 23, 23A.

In FIG. 2, clamps 23 and 23A have been clamped to existing beam 30 and to the foot 11 and neck 12 of the existing conventional stanchion 10 supporting the foot or flange 30C of beam 30. Bolt 24 has tightened U-shaped clamps 23A and 23 in the direction of arrows A and B until inner faces 23B and 23C of clamps 23A and 23, respectively, bear against foot 11 and/or the outer tips 30D and 30E of flange 30C, and until a portion of each edge 36 bears against neck 12. In FIG. 2, the bolt 24 extending through aperture 26 of clamp 23A and aperture 25 of clamp 23 has been omitted for the sake of clarity. The bolt 24 depicted in FIG. 2 extends through aperture 25 of clamp 23A and aperture 26 of clamp 23. If desired, edges 36 need not bear against neck 12 and only surfaces 23B and 23C need bear against foot 11 and/or the outer tips 30D and 30E of flange 30C. It is, however, preferred that edges 36 bear against neck 12 because this helps stabilize and fix clamps 23A and 23 in the position illustrated in FIG. 2. Clamps 23 and 23A can also be shaped and dimensioned such that edges 35 bear against the upstanding member 30A of beam 30.

Figure 3:
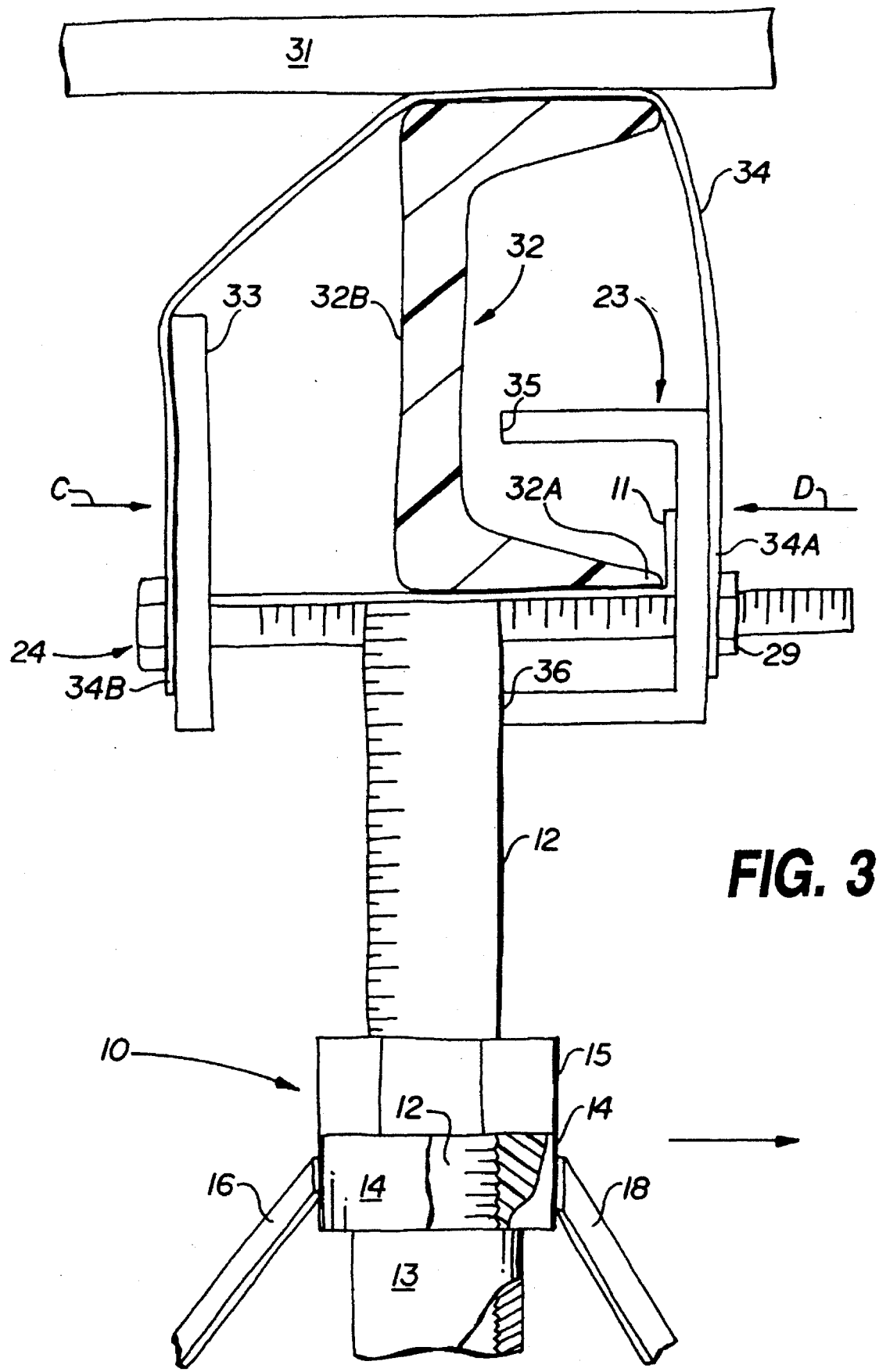

In FIG. 3, foot 11 supports C-beam 32 and clamp 23A has been replaced by flat horizontal plate having a pair of apertures with a size and spacing equivalent to that of apertures 25 and 26 of clamp 23. Bolt 24 in FIG. 3 presses plate 33 against foot 11 and draws clamp 23 toward plate 33 against the other side of foot 11. Edge 36 of clamp 23 preferably bears against neck 12, but, as described above, need not do so. Strap 34 is attached to and interconnects plate 33 and clamp 23. Strap 34 extends intermediate beam 32 and the floor 31 of a mobile home.

In operation of the embodiment of the invention shown in FIGS. 1 and 2, the clamps 23, 23A, bolts 24, and nuts 29 are transported to an existing mobile home with I-beams 30 which rest on and are supported by conventional stanchions 10. Nuts 29 and bolts 24 are used to install clamps 23, 23A in the manner illustrated in FIG. 2 on a conventional stanchion 10—I-beam 30 without requiring that the mobile home, I-beam, or conventional stanchion 10 be moved. The plate 33, clamp 23, and strap 34 of FIG. 3 are similarly installed with nuts 29 and bolts 24 on an existing mobile home C-beam—stanchion 10 without requiring that the mobile home, C-beam, or stanchion 10 be moved. In FIG. 2, nut 29 is tightened on bolt 24 to force clamp 23A in the direction of arrow A and clamp 23 in the direction of arrow B.

During installation of the apparatus of FIG. 3, strap 34 is threaded over beam 32 and is, along with plate 33 and clamp 23, secured in position with bolts 24 and nuts 29. A pair of holes are formed through one end 34A of strap 34 such that the holes slide over the ends of bolts 24 and the end of strap 34 is compressed between nuts 29 and clamp 23 in the manner shown in FIG. 3. Another pair of holes are formed through the other end 34B of the strap 34 such that the bolts 24 slid through the holes and compress end 34B intermediate the bolt 24 heads and plate 33 in the manner shown in FIG. 3.

In FIG. 2, pressing clamps 23A and 23 against the tips or ends 30D, 30C of beam 30 or against foot 11 to create pressure points bearing against ends 30D, 30C is preferred in the practice of the invention because such pressure points help prevent movement of foot 30C.

In another preferred embodiment of the invention, in FIG. 3, C-beam 32 is centered over neck 12 instead of being off to the right as shown in FIG. 3. The horizontal portion of existing foot 11 is shorter and permits plate 33 to bear directly against and contacts the back flat surface 32B of beam 32, and clamp 32 also creates a pressure point against toe 32A by pressing the upstanding portion of foot 11 against toe 32A in the manner illustrated in FIG. 3. Nut 29 is tightened on bolt 24 to force plate 33 and clamp 23 toward one another when plate 33 and clamp 23 are initially installed on stanchion 10 and beam 32 in the general positions illustrated in FIG. 3. Tightening nut 29 on bolt 24 then forces flat rectangular plate 33 in the direction of arrow C toward and against back 32B and forces clamp 23 in the direction of arrow D toward and against toe 32A. If desired, a C-clamp 23A can be utilized in FIG. 3 in plate of plate 33. The C-clamp is shaped and dimensioned such that edge 36 of the C-clamp 23 bears against neck 12. If desired, the C-clamp can be shaped such that edge 35 also bears against surface 32B.

Having described my invention in such terms as to enable those skilled in the art to make and practice the invention, I claim:

1. In combination with a mobile building and an anchor apparatus for the mobile building, the mobile building including a body member rigidly supported on a frame member, the frame member having a flange member extending therefrom and spaced from the body member, the anchor apparatus including a frame having a top and a bottom anchored to the ground, a support member contacting the flange member, the support member having first and second side surfaces, and a neck interconnecting the frame and the support member, the improvements for preventing movement of the flange member off of the support member, said improvements comprising an adjustable bracket assembly including (a) a first bracket;

(b) a second bracket spaced apart from said first bracket; and, (c) fastening means connecting said first and second brackets;

said fastening means and brackets being shaped and dimensioned such that (i) said fastening means inwardly compresses each of said first and second brackets toward one another and against said neck and one of said first and second side surfaces, and (ii) said brackets prevent said flange member from moving off of said support member.

\* \* \* \* \*